US011063462B2

(12) United States Patent
Niimi et al.

(10) Patent No.: US 11,063,462 B2
(45) Date of Patent: Jul. 13, 2021

(54) CHARGING APPARATUS

(71) Applicant: TOYOTA JIDOSHA KABUSHIKI KAISHA, Toyota (JP)

(72) Inventors: Yoshitaka Niimi, Susono (JP); Naoyoshi Takamatsu, Shizuoka-ken (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 163 days.

(21) Appl. No.: 16/539,273

(22) Filed: Aug. 13, 2019

(65) Prior Publication Data

US 2020/0106287 A1    Apr. 2, 2020

(30) Foreign Application Priority Data

Sep. 27, 2018 (JP) .............................. JP2018-182509

(51) Int. Cl.
*H02J 7/02* (2016.01)
*B60L 53/22* (2019.01)
*B60L 50/51* (2019.01)
*H02J 7/00* (2006.01)
*H02M 7/537* (2006.01)
*H02P 27/06* (2006.01)

(52) U.S. Cl.
CPC .............. *H02J 7/022* (2013.01); *B60L 50/51* (2019.02); *B60L 53/22* (2019.02); *H02J 7/007* (2013.01);
(Continued)

(58) Field of Classification Search
CPC .......... B60L 50/51; B60L 53/22; B60L 58/19; B60L 2210/46; B60L 2220/58;
(Continued)

(56) References Cited

U.S. PATENT DOCUMENTS 5,506,765 A     4/1996  Nakata et al.
2006/0164028 A1  7/2006  Welchko et al.
(Continued)

FOREIGN PATENT DOCUMENTS

DE   10 2018 000 491 A1   7/2018
JP        5-300750 A     11/1993
JP      2006-238686 A     9/2006
JP      2017-158233 A     9/2017

OTHER PUBLICATIONS

Ruoyun Shi et al., "Constant Current Fast Charging of Electric Vehicles via a DC Grid Using a Dual-Inverter Drive", IEEE Transactions on Industrial Electronics, Sep. 2017, vol. 64, No. 9, pp. 6940-6949 (total 10 pages).
(Continued)

*Primary Examiner* — Paul Dinh
(74) *Attorney, Agent, or Firm* — Sughrue Mion, PLLC

(57) ABSTRACT

A charging apparatus includes: an electric power source circuit including a first inverter and a second inverter to drive one motor; and a charging port having a positive electrode terminal connected to a positive electrode side of a first storage battery, and a negative electrode terminal connected to a negative electrode side of a second storage battery. In the case where the battery charger outputs first electric power, the first storage battery and the second storage battery are connected in parallel when being charged with the first electric power. In the case where the battery charger outputs second electric power that is larger than the first electric power, the first storage battery and the second storage battery are connected in series when being charged with the second electric power.

11 Claims, 5 Drawing Sheets

(52) U.S. Cl.
CPC ...... *H02J 7/0014* (2013.01); *H02J 7/007192* (2020.01); *H02M 7/537* (2013.01); *H02P 27/06* (2013.01); *B60L 2210/46* (2013.01); *B60L 2220/58* (2013.01)

(58) Field of Classification Search
CPC ........ H02J 7/022; H02J 7/0014; H02J 7/0024; H02J 7/007; H02J 7/537; H02P 27/06; Y02T 10/92; Y02T 90/14
USPC .......................................... 320/107, 116, 117
See application file for complete search history.

(56) References Cited

U.S. PATENT DOCUMENTS

2019/0305385 A1* 10/2019 Tsuchiya ................. B60L 58/19
2020/0185936 A1*  6/2020 Oishi .................... H02J 7/0024

OTHER PUBLICATIONS

Sepehr Semsar et al., "Integrated Single-Phase electric Vehicle Charging Using a Dual-Inverter Drive", 2018 IEEE Transportation Electrification Conference and expo (ITEC), IEEE, Jun. 13, 2018, pp. 320-325 (total 6 pages).

Jinseok Hong, et al., "Charging Method for the Secondary Battery in Dual-Inverter Drive Systems for Electric Vehicles", IEEE Transactions on Power electronics, Feb. 2015, vol. 30, No. 2, pp. 909-921 (total 13 pages).

* cited by examiner

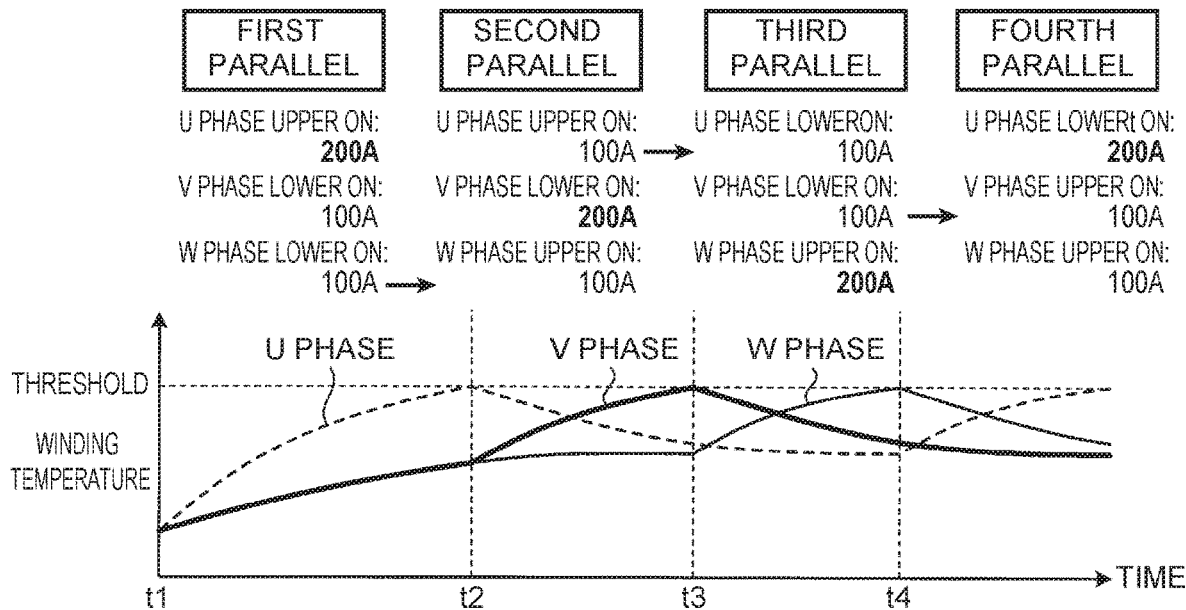

CHARGING APPARATUS

INCORPORATION BY REFERENCE

The disclosure of Japanese Patent Application No. 2018-182509 filed on Sep. 27, 2018 including the specification, drawings and abstract is incorporated herein by reference in its entirety.

BACKGROUND

1. Technical Field

The present disclosure relates to a charging apparatus.

2. Description of Related Art

Disclosed in Japanese Patent Application Publication No. 2006-238686 (JP 2006-238686 A) is an electric power source circuit which drives one load with two storage batteries and two inverters as a double ended inverter system mounted on a vehicle.

SUMMARY

When a storage battery mounted on a vehicle is charged with electric power from an external power source, direct-current electric power from the external power source is supplied to an on-vehicle storage battery as fast charging. In the fast charging, there is ultra-fast charging which enables charging to be completed in a shorter time than before. For example, ultra-fast charging standards include an ultra-fast charging standard that prescribes a maximum output of 150 kW at a maximum voltage of 500 V and a maximum current of 400 A, and an ultra-fast charging standard that prescribes a maximum output of 350 kW at a maximum voltage of 1000 V and a maximum current of 400 A.

The ultra-fast charging standard of 150-kW class is different in magnitude of output voltage from the ultra-fast charging standard of 350-kW class. In this case, when a storage battery is designed to have a maximum voltage of 500V in order to support the output electric power in conformity with the ultra-fast charging standard of the 150-kW class, and the storage battery is connected to charging equipment in conformity with the ultra-fast charging standard of the 350-kW class, the storage battery can be charged with the maximum electric power of 150 kW due to current restrictions. When the storage battery is designed to have a maximum voltage of 1000 V in order to support the electric power in conformity with the ultra-fast charging standard of the 350-kW class, the storage battery cannot be charged with use of charging equipment having the ultra-fast charging standard of the 150-kW class due to voltage restrictions. Accordingly, when the side of the battery chargers used as external power sources has a plurality of ultra-fast charging standards, it is desirable that a charging apparatus side, including the storage battery, supports each of the ultra-fast charging standards. Furthermore, since the ultra-fast charging standards have large maximum current values, it is also desirable to consider heat generation that occurs in lead wires on the charging apparatus side during charging.

The present disclosure provides a charging apparatus capable of supporting a plurality of ultra-fast charging standards, while reducing heat generation caused by energization.

The present disclosure includes an electric power source circuit and a charging port. The electric power source circuit includes a first inverter connected between a first storage battery and a load, and a second inverter connected between a second storage battery and the load to drive the one load. The charging port is connected with an external power source when the first storage battery and the second storage battery are charged with electric power from an external power source. The charging port has a positive electrode terminal that is connected to a positive electrode side of the first storage battery, and a negative electrode terminal that is connected to a negative electrode side of the second storage battery. In the case were the electric power output from the external power source is first electric power, the electric power source circuit is in the state where the first storage battery and the second storage battery are connected in parallel when the batteries are charged with the first electric power. In the case where the electric power output from the external power source is second electric power that is larger than the first electric power, the electric power source circuit is in the state where the first storage battery and the second storage battery are connected in series when the batteries are charged with the second electric power.

The first electric power may be electric power having a maximum voltage of a first value and a maximum current of a prescribed current value, whereas the second electric power may be electric power having a maximum voltage of a second value that is larger than the first value and a maximum current of a prescribed current value.

With the configuration, each of the storage batteries can be charged with electric power supply from the external power source corresponding to the first electric power and the second electric power which are different in magnitude of maximum electric power. This makes it possible to support a plurality of ultra-fast charging standards different in magnitude of output voltage.

The first storage battery and the second storage battery may have voltages set to the first value, and a sum of the voltage of the first storage battery and the voltage of the second storage battery may be set to the second value.

With the configuration, the first storage battery and the second storage battery have voltages set to the first value. Hence, in the case of performing charging with electric power supply from the external power source which outputs the first electric power having the first value as the maximum voltage, the charging can be achieved by connecting the first storage battery and the second storage battery in parallel. Moreover, the sum of the voltage of the first storage battery and the voltage of the second storage battery is set to the second value. Hence, in the case of performing charging with electric power supply from the external power source which outputs the second electric power having the second value as the maximum voltage, the charging can be achieved by connecting the first storage battery and the second storage battery in series.

The load may be a three-phase alternating-current electric motor that is driven with alternating-current electric power, and the charging apparatus may further include a control unit that performs equalization control that reduces a difference amongheat values generated in winding wires of three phases of the three-phase alternating-current electric motor, when the storage batteries are charged with the electric power from the external power source.

According to the configuration, even in the case where a large current in conformity with the ultra-fast charging standards flows into the winding wires of the three-phase alternating-current electric motor, the control unit can perform equalization control, which can reduce concentrative heat generation in the winding wire of a specific phase out of the three phases.

The first inverter and the second inverter may each include switching elements corresponding to respective phases of the three-phase alternating-current motor, and the control unit may perform control of switching ON and OFF of the switching elements as the equalization control.

With the configuration, the control unit performs control of switching ON and OFF of the switching elements of each inverter as the equalization control during charging, which can reduce concentrative heat generation in the winding wire of a specific phase out of the three phases. This makes it possible to reduce continuous increase in temperature of the winding wire of a specific phase at the time of charging.

The first inverter and the second inverter may each include the six switching elements included in upper-lower arms of the respective phases. When the first storage battery and the second storage battery are connected in parallel to charge the storage batteries with the first electric power, the control unit may perform, as the equalization control, ON and OFF control of the switching elements to achieve a connection state where a first current value of a current flowing through a winding wire of one phase, out of three phases, becomes larger than a second current value of a current flowing through winding wires of remaining two phases.

With the configuration, the control unit controls ON and OFF of the switching elements such that current flows into all the winding wires of the three phases during charging in the state where the first storage battery and the second storage battery are connected in parallel. Accordingly, it is possible to feed the current of the first current value only to one phase, while it is also possible to feed the current to the winding wires of the three phases in a distributed manner. As a result, the difference among heat values generated in the winding wires of the three phases can be reduced.

When a winding wire of one phase, out of the winding wires of the three phases, has a temperature higher than a prescribed threshold, the control unit may switch ON and OFF of the switching elements such that the current of the first current value flows into the winding wire lowest in temperature among the winding wires of the three phases.

With the configuration, the control unit switches the magnitude of the current flowing through the winding wires of the respective phases based on the temperature of the winding wires. As a result, the winding wire of the phase which receives a current flow of the first current value can be switched. This makes it possible to reduce continuous increase in temperature of the winding wire of a specific phase.

When a winding wire of one phase, out of the winding wires of the three phases, has a temperature higher than a prescribed threshold, the control unit may be configured to switch ON and OFF of the switching elements such that the current of the first current value flows into the winding wires of U phase, V phase, and W phase in order.

With the configuration, the winding wire which receives a current flow of the first current value is switched in order of the winding wires of U phase, V phase, and W phase. This makes it possible to reduce continuous increase in temperature of the winding wire of a specific phase.

When a prescribed time elapses during the equalization control, the control unit may switch ON and OFF of the switching elements such that the current of the first current value flows into the winding wire lowest in temperature among the winding wires of the three phases.

With the configuration, the control unit switches ON and OFF of the switching elements such that the current of the first current value flows into the winding wire lowest in temperature, among the winding wires of the three phases, with the elapse of time during charging. Hence, it is possible to switch the magnitude of the current flowing through the winding wires of the respective phases which are in the state of parallel connection during charging.

When a prescribed time elapses during the equalization control, the control unit may switch ON and OFF of the switching elements such that the current of the first current value flows into the winding wires of U phase, V phase, and W phase in order.

With the configuration, the control unit switches ON and OFF of the switching elements, in accordance with the elapse of time during charging, such that the current of the first current value flows into the winding wires of U phase, V phase, and W phase in order. As a result, even in the state where the winding temperature is unknown, the magnitude of the current flowing through the winding wires of the respective phases can be switched in accordance with the elapse of time.

When the first storage battery and the second storage battery are connected in series to charge the storage batteries with the second electric power, the control unit may turn on lower arm elements of all the three phases among the switching elements included in the first inverter, and turn on upper arm elements of all the three phases among the switching elements included in the second inverter, as the equalization control.

With the configuration, the control unit controls the switching elements of the inverters such that the current flows into all the winding wires of the three phases during charging in the state where the first storage battery and the second storage battery are connected in series. As a result, the winding wires of the respective phases can receive a current flow of the same magnitude, which can reduce the difference among heat values generated in the winding wires of the respective phases.

The present disclosure can charge the first storage battery and the second storage battery with the electric power supply from external power sources, in conformity with a plurality of ultra-fast charging standards in the external power sources, while reducing heat generation by energization.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a time chart showing a temperature change in the winding wires of three phases;

FIG. 6 shows a switching pattern of the parallel connection state;

DETAILED DESCRIPTION OF EMBODIMENTS

Hereinafter, a charging apparatus in the embodiments of the present disclosure will be described with reference to the drawings. The present disclosure is not limited to the embodiments described below.

First Embodiment

Figure 1:
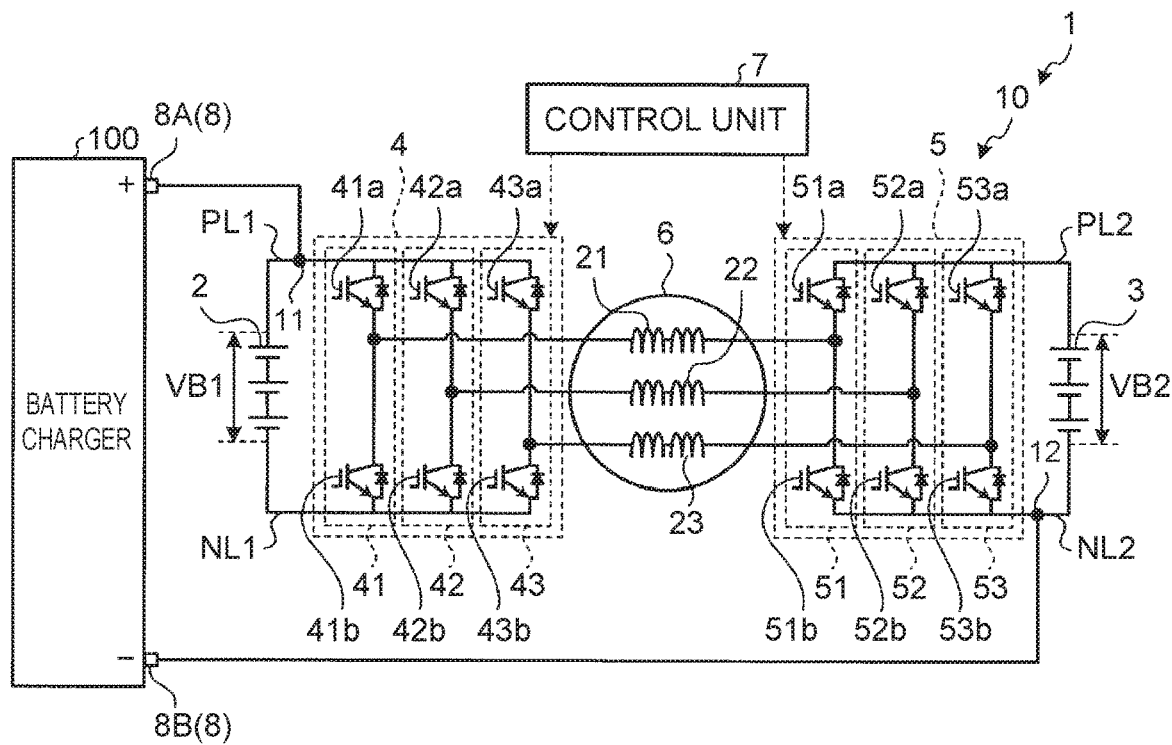
FIG. 1 schematically shows a charging apparatus of a first embodiment.

FIG. 1 schematically shows a charging apparatus of a first embodiment. As shown in FIG. 1, a charging apparatus 1 of the first embodiment includes an electric power source circuit 10 that drives one motor 6 with two storage batteries 2, 3 and two inverters 4, 5. The electric power source circuit 10 is a double ended inverter system. The charging apparatus 1 also includes a control unit 7 that controls two inverters 4, 5, and a charging port 8 that is connected to a battery charger 100 serving as an external electric power source.

The electric power source circuit 10 converts direct-current electric power output from the first storage battery 2 into alternating-current electric power with the first inverter 4, and supplies the alternating-current electric power to the motor 6 from the first inverter 4. The motor 6 is driven with the alternating-current electric power. The electric power source circuit 10 also converts direct-current electric power output from the second storage battery 3 into alternating-current electric power with the second inverter 5, and supplies the alternating-current electric power to the motor 6 from the second inverter 5. Thus, driving of the motor 6 is controlled by command signals output to the two inverters 4, 5 from the control unit 7. In the electric power source circuit 10, the first storage battery 2 and the second storage battery 3 are connected through the first inverter 4, the motor 6, and the second inverter 5.

The first storage battery 2 is a chargeable and dischargeable secondary battery, which is electrically connected with the first inverter 4 through a positive electrode-side line PL1 and a negative electrode-side line NL1. The electric power discharged from the first storage battery 2 is supplied to the motor 6 through the first inverter 4.

The second storage battery 3 is a chargeable and dischargeable secondary battery, which is electrically connected with the second inverter 5 through a positive electrode-side line PL2 and a negative electrode-side line NL2. The electric power discharged from the second storage battery 3 is supplied to the motor 6 through the second inverter 5.

The first inverter 4 and the second inverter 5 are each includes an inverter circuit including a plurality of switching elements and diodes provided for every phase such that current of three phases can be conducted to winding wires. The inverters 4, 5 can each convert direct-current electric power into alternating-current electric power by switching operation for switching ON and OFF of the switching elements.

The first inverter 4 includes six switching elements 41a, 41b, 42a, 42b, 43a, 43b which included in upper-lower arms 41, 42, 43 of the respective phases (U phase, V phase, W phase). In the upper-lower arm 41 of U phase, the switching element 41a serving as an upper arm element, and the switching element 41b serving as a lower arm element are connected in series. In the upper-lower arm 42 of V phase, the switching element 42a serving as an upper arm element, and the switching element 42b serving as a lower arm element are connected in series. In the upper-lower arm 43 of W phase, the switching element 43a serving as an upper arm element, and the switching element 43b serving as a lower arm element are connected in series. The switching elements 41a, 41b, 42a, 42b, 43a, 43b are each configured with a transistor element. Furthermore, the switching elements 41a, 41b, 42a, 42b, 43a, 43b are connected in parallel to the diodes, respectively.

The second inverter 5 includes six switching elements 51a, 51b, 52a, 52b, 53a, 53b which included in upper-lower arms 51, 52, 53 of the respective phases (U phase, V phase, W phase). In the upper-lower arm 51 of U phase, the switching element 51a serving as an upper arm element, and the switching element 51b serving as a lower arm element are connected in series. In the upper-lower arm 52 of V phase, the switching element 52a serving as an upper arm element, and the switching element 52b serving as a lower arm element are connected in series. In the upper-lower arm 53 of W phase, the switching element 53a serving as an upper arm element, and the switching element 53b serving as a lower arm element are connected in series. The switching elements 51a, 51b, 52a, 52b, 53a, 53b are each configured with a transistor element. Furthermore, the switching elements 51a, 51b, 52a, 52b, 53a, 53b are connected in parallel to the diodes, respectively.

The motor 6 is electrically connected with the first storage battery 2 through the first inverter 4, and is also electrically connected with the second storage battery 3 through the second inverter 5. The motor 6 is a three-phase alternating current motor. Winding wires of three phases (a winding wire 21 of U phase, a winding wire 22 of V phase, a winding wire 23 of W phase) coiled around a stator of the motor 6 are electrically connected with each of the inverters 4, 5. The winding wire 21 of U phase is connected to the upper-lower arm 41 of U phase of the first inverter 4, and the upper-lower arm 51 of U phase of the second inverter 5. The winding wire 22 of V phase is connected to the upper-lower arm 42 of V phase of the first inverter 4, and the upper-lower arm 52 of V phase of the second inverter 5. The winding wire 23 of W phase is connected to the upper-lower arm 43 of W phase of the first inverter 4, and the upper-lower arm 53 of W phase of the second inverter 5. When a current flows to the winding wires 21, 22, 23 of the three phases, the motor 6 is driven. The motor 6 is a load connected to the electric power source circuit 10. When the charging apparatus 1 is mounted on a vehicle, the motor 6 functions as a power source for traveling.

The control unit 7 includes an electronic control unit (ECU) including a CPU, a storage unit that stores data of various programs or the like, and an arithmetic processing unit that performs various kinds of arithmetic calculation for drive control of the motor 6. For example, as a result of an arithmetic calculation in the arithmetic processing unit, command signals for controlling each of the inverters 4, 5 are output to each of the inverters 4, 5 from the control unit 7. The command signals include a switching command for switching a switching element, among the switching elements included in the two inverters 4, 5, which is a control target of the switching operation.

The charging port 8 is a connection port that is connected to the battery charger 100 serving as charging equipment, when the storage batteries 2, 3 of the charging apparatus 1 are charged with the electric power from an external power source. The battery charger 100 includes, for example, a charging stand having a cable and a charge plug (which are not shown). The charge plug of the battery charger 100 is connected to the charging port 8.

In the charging apparatus 1, the charging port 8 and the electric power source circuit 10 are electrically connected. The charging port 8 has a positive electrode terminal 8A connected to the positive electrode side of the first storage battery 2. The charging port 8 has a negative electrode terminal 8B connected to the negative electrode side of the second storage battery 3.

As shown in FIG. 1, a first connection point 11, provided on a portion of the positive electrode-side line PL1 between the positive electrode of the first storage battery 2 and the first inverter 4, is connected to the positive electrode terminal 8A of the charging port 8. Furthermore, a second connection point 12, provided on a portion of the negative electrode-side line NL2 between the negative electrode of the second storage battery 3 and the second inverter 5, is connected to the negative electrode terminal 8B of the charging port 8.

When charging the storage batteries 2, 3 with the electric power from the battery charger 100, the charging apparatus 1 can support different charging standards by switching between the state (parallel connection state) where the two storage batteries 2, 3 are connected in parallel and the state (series connection state) where the two storage batteries 2, 3 are connected in series. A fast charging standard is used, for example, in a charging stand that outputs direct-current electric power. Charging standards different from the fast charging standard may include an ultra-fast charging standard prescribing a maximum output of 150-kW class, and an ultra-fast charging standard prescribing a maximum output of 350-kW class. To support the ultra-fast charging standards, the charging apparatus 1 connects the two storage batteries 2, 3 via the two inverters 4, 5 and the one motor 6, and switches the connection state of the storage batteries between the parallel connection and the series connection with the inverters.

Figure 2:
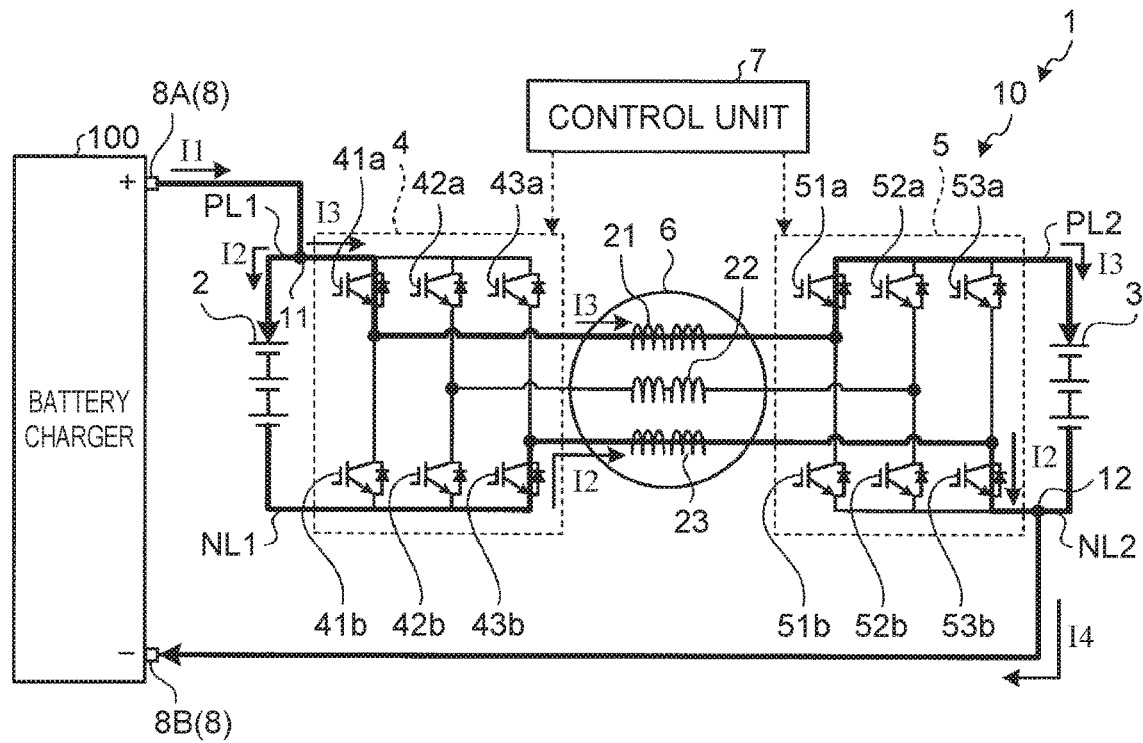
FIG. 2 shows the case where two storage batteries, in the state of being connected in parallel, are charged with the electric power supplied from an external power source.
Figure 3:
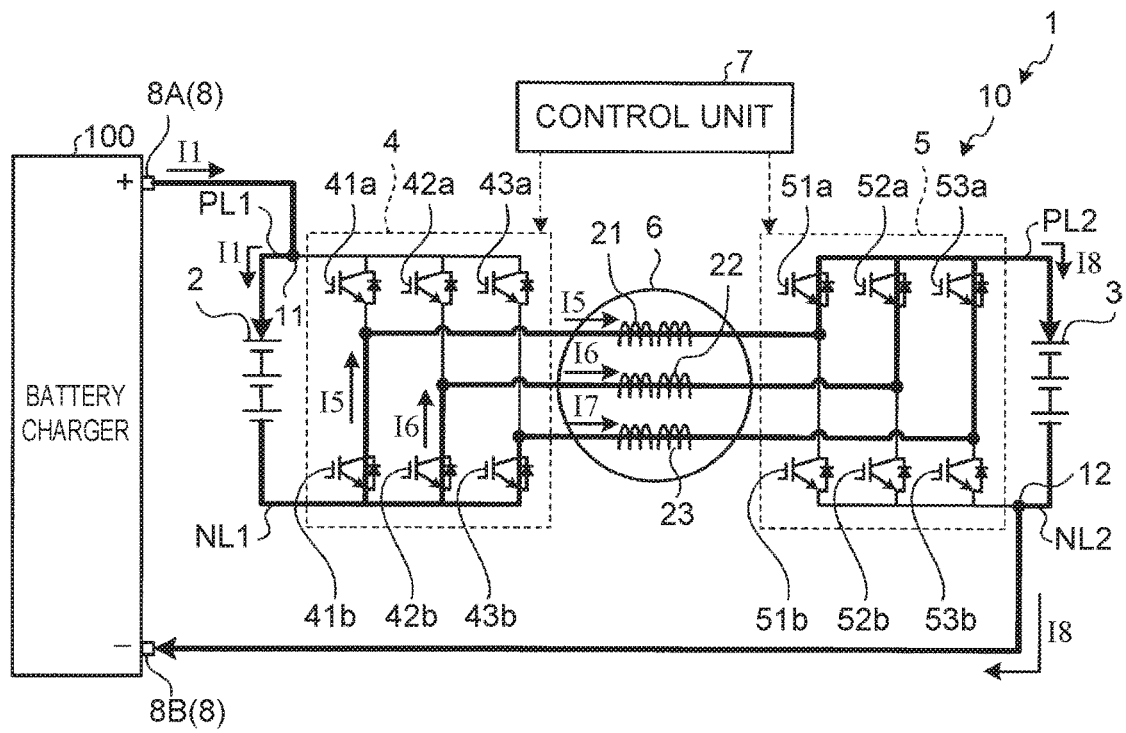
FIG. 3 shows the case where two storage batteries, in the state of being connected in series, are charged with the electric power supplied from an external power source.

Here, description is given of the case where the two storage batteries 2, 3 are charged in the state of being connected in parallel and the case where the two storage batteries 2, 3 are charged in the state of being connected in series with reference to FIGS. 2 and 3.

FIG. 2 shows the case where the two storage batteries, in the state of being connected in parallel, are charged with the electric power supplied from an external power source. In the state where the first storage battery 2 and the second storage battery 3 are connected in parallel, the charging port 8 of the charging apparatus 1 is connected to the charge plug of the battery charger 100. For example, the battery charger 100 is a fast charging stand which can output electric power (first electric power) having a maximum output of 150 kW at a maximum voltage of 500 V (first value) and a maximum current of 400 A. In this case, the charging apparatus 1 puts the two storage batteries 2, 3 in the parallel connection state, and charges the storage batteries 2, 3 with the electric power supply from the battery charger 100 that is configured in conformity with the ultra-fast charging standard of the 150-kW class. On the charging apparatus 1 side, the first storage battery 2 is designed to have a voltage VB1 of 500V, and the second storage battery 3 is designed to have a voltage VB2 of 500V. That is, the voltage VB1 of the first storage battery 2 and the voltage VB2 of the second storage battery 3 are set to the same value as the maximum voltage (first value) of the external power source that is configured in conformity with the ultra-fast charging standard of the 150-kW class. As shown in FIG. 2, in the first inverter 4, the switching element 41a that is the upper arm element of U phase is set to ON, and the switching element 43b that is the lower arm element of W phase is set to ON. In addition, in the second inverter 5, the switching element 51a that is the upper arm element of U phase is set to ON, and the switching element 53b that is the lower arm element of W phase is set to ON. In the parallel connection state shown in FIG. 2, in the first inverter 4 and the second inverter 5, the switching elements 42a, 42b, 52a, 52b of V phase are all set to OFF.

When the direct-current electric power from the battery charger 100 which is an external power source with a maximum output of 150-kW class is supplied to the charging apparatus 1 in the parallel connection state shown in FIG. 2, a current I1 of 400 A flows from the positive electrode terminal 8A of the charging port 8 to the electric power source circuit 10, and the current I1 is divided at the first connection point 11 into a current I2 on the first storage battery 2 side and a current I3 on the second storage battery 3 side. On the first storage battery 2 side, the current I2 of 200 A flows from the first connection point 11 to the positive electrode of the first battery. Then, the current I2 of 200 A flows from the negative electrode side of the first storage battery 2 to the winding wire 23 of W phase via the switching element 43b that is the lower arm element of W phase of the first inverter 4. The current I2 travels from the winding wire 23 of W phase to the second connection point 12 via the switching element 53b that is the lower arm element of W phase of the second inverter 5. On the second storage battery 3 side, the current I3 of 200 A flows from the first connection point 11 into the upper arm of the first inverter 4. The current I3 of 200 A then flows into the winding wire 21 of U phase via the switching element 41a that is the upper arm element of U phase. The current I3 flows from the winding wire 21 of U phase into the positive electrode of the second storage battery 3 via the switching element 51a that is the upper arm element of U phase of the second inverter 5. Then, the current I3 travels from the negative electrode side of the second storage battery 3 to the second connection point 12. The current I2 and the current I3 then merge at the second connection point 12 to be a current I4 of 400 A. The current I4 flows from the second connection point 12 to the negative electrode terminal 8B of the charging port 8.

FIG. 3 shows the case where the two storage batteries, in the state of being connected in series, are charged with the electric power supplied from an external power source. In the state where the first storage battery 2 and the second storage battery 3 are connected in series, the charging port 8 of the charging apparatus 1 is connected to the charge plug of the battery charger 100. For example, the battery charger 100 is a fast charging stand which can output electric power (second electric power) with a maximum output of 350 kW at a maximum voltage of 1000 V (second value) and a maximum current of 400 A. In this case, the charging apparatus 1 puts the two storage batteries 2, 3 in the series connection state, and charges the storage batteries 2, 3 with the electric power supply from the battery charger 100 that is configured in conformity with the ultra-fast charging standard of 350 kW class. Also in this case, on the charging apparatus 1 side, the first storage battery 2 is designed to have a voltage VB1 of 500V, and the second storage battery 3 is designed to have a voltage VB2 of 500V. That is, a sum of the voltage VB1 of the first storage battery 2 and the voltage VB2 of the second storage battery 3 is set to the same value as the maximum voltage of the external power source that is configured in conformity with the ultra-fast charging standard of 350 kW class. As shown in FIG. 3, in the first inverter 4, the three switching elements 41b, 42b, 43b included in the lower arm elements of the three phases are set to ON. In addition, in the second inverter 5, the three switching elements 51a, 52a, 53a included in the upper arm elements of the three phases are set to ON. In the state of the parallel connection shown in FIG. 3, the switching elements 41a, 42a, 43a of the upper arms of the first inverter 4 and the switching elements 51b, 52b, 53b of the lower arms of the second inverter 5 are all set to OFF.

When the direct-current electric power, from the battery charger 100 which is an external power source with a maximum output of 350-kW class, is supplied to the charging apparatus 1 in the series connection state shown in FIG. 3, a current I1 of 400 A, flowing from the positive electrode terminal 8A of the charging port 8 into the first connection point 11 of the electric power source circuit 10, flows from the first connection point 11 into the positive electrode of the first storage battery 2. Then, currents I5, I6, I7 flow from the negative electrode side of the first storage battery 2 to the winding wires 21, 22, 23 of the three phases via the switching elements 41b, 42b, 43b included in the lower arm elements of the three phases of the first inverter 4. In this case, when the resistance of a route extending through the winding wire 21 of U phase, the resistance of a route extending through the winding wire 22 of V phase, and the resistance of a route extending through the winding wire 23 of W phase have the same resistance value, the currents I5, I6, I7 have the same current value. The current I5 flows from the winding wire 21 of U phase into the positive electrode-side line PL2 of the second storage battery 3 via the switching element 51a that is the upper arm element of U phase of the second inverter 5. The current I6 flows from the winding wire 22 of V phase into the positive electrode-side line PL2 of the second storage battery 3 via the switching element 52a that is the upper arm element of V phase of the second inverter 5. The current I7 flows from the winding wire 23 of W phase into the positive electrode-side line PL2 of the second storage battery 3 via the switching element 53a that is the upper arm element of W phase of the second inverter 5. In the positive electrode-side line PL2, the currents I5, I6, I7 merge to be a current I8 of 400 A, and the current I8 flows into the positive electrode of the second storage battery 3. The current I8 flowing from the negative electrode side of the second storage battery 3 to the negative electrode-side line NL2 then flows into the negative electrode terminal 8B of the charging port 8 via the second connection point 12.

When charging is performed while the charging apparatus 1 is put in the series connection state shown in the FIG. 3, it is possible to use the external power source which outputs electric power of 350-kW class. Thus, the charging apparatus 1 can support the ultra-fast charging standards by switching the state where the two storage batteries 2, 3 are connected in parallel and the state where two storage batteries 2, 3 are connected in series.

As described in the foregoing, the charging apparatus 1 of the first embodiment can use the battery charger 100 that is configured in conformity with the ultra-fast charging standards different in magnitude of voltage. Thus, the charging apparatus 1 including a double ended inverter system can support both the ultra-fast charging standard of 150-kW class and the ultra-fast charging standard of 350-kW class.

Furthermore, when the two storage batteries 2, 3 in the state of being connected in series are charged with the electric power supply from the battery charger 100, electric current is fed to all the winding wires 21, 22, 23 of the three phases between the negative electrode side of the first storage battery 2 and the positive electrode side of the second storage battery 3. As a result, the heat values generated in the winding wires can be equalized. Thus, during charging of the storage batteries 2, 3 with the electric power from the external battery charger 100, increase in winding temperature can be reduced.

Although the first embodiment has been described about the case where the voltage VB1 of the first storage battery 2 and the voltage VB2 of the second storage battery 3 are both designed to 500V, the voltage value of the storage batteries 2, 3 is not limited to this. For example, the storage batteries 2, 3, may be designed to have a voltage of 400V. The storage batteries 2, 3 may have a voltage value at least smaller than the maximum voltage in conformity with the ultra-fast charging standard of 350-kW class, and may have a voltage value close to the maximum voltage in conformity with the ultra-fast charging standard of 150-kW class.

The maximum voltage which defines the ultra-fast charging standard of 150-kW class may be set to 500V, and the voltages VB1, VB2 of the storage batteries 2, 3 may be set to 400V. Furthermore, the maximum voltage which defines the ultra-fast charging standard of 350-kW class may be set to the second value that is in the range of 900 V to 1000 V. In this case, the voltages VB1, VB2 of the storage batteries 2, 3 may be set to half the second value. In the fast charging standard of 50-kW class that is a conventional fast charging standard, the maximum voltage is 500V, and the maximum current is 125 A. The ultra-fast charging standards of 150-kW class and 350-kW class described here refer to the charging standards which are larger in maximum current value than the conventional fast charging standard of 50-kW class.

Furthermore, in the case where the first storage battery 2 and the second storage battery 3 are connected in series, the connection state is not limited to the state where a current is fed to all the winding wires 21, 22, 23 of the three phases, as in the series connection state shown in the FIG. 3. That is, when the connection state of the two storage batteries 2, 3 is series connection, ON-OFF control of the switching elements may be performed such that a current flows at least through the winding wire of one phase, out of the winding wires 21, 22, 23 of the three phases. That is, from the state shown in FIG. 3, the switching elements 41b, 43b that are the lower arm elements of U and W phases of the first inverter 4 may be set to OFF, and the switching elements 51a, 53a that are the upper arm elements of U and W phases of the second inverter 5 may be set to OFF, so that the two storage batteries 2, 3 may be connected in series in the state where a current flows only through the winding wire 22 of V phase. Similarly, the series connection state where a current flows only through the winding wire 21 of U phase, and the series connection state where a current flows only through the winding wire 23 of W phase may be adoptable.

Second Embodiment

The charging apparatus 1 of the second embodiment is configured to equalize the heat values generated in the winding wires 21, 22, 23 of the three phases, while the storage batteries 2, 3, in the state of being connected in parallel, are charged with the electric power from an external power source. In the description of the second embodiment, the component members identical to those in the first embodiment are designated by identical reference signs to omit the description thereof.

In the second embodiment, ON-OFF control of the switching elements of the inverters 4, 5 is performed such that a current flows into all the winding wires 21, 22, 23 of the three phases in the state where the first storage battery 2 and the second storage battery 3 are connected in parallel (parallel connection state). In the second embodiment, the state where the first storage battery 2 and the second storage battery 3 are connected through only the winding wire of one phase is stated as a single connection.

Figure 4:
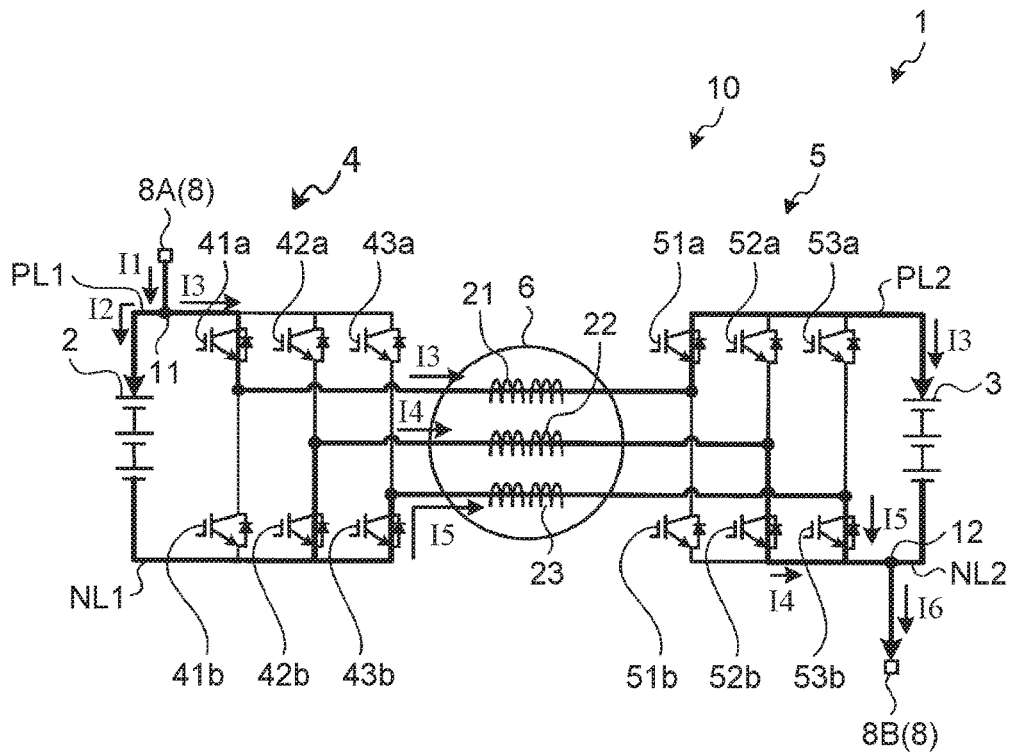
FIG. 4 is an explanatory view illustrating the parallel connection state in a second embodiment.

FIG. 4 is an explanatory view illustrating the parallel connection state in the second embodiment. In FIG. 4, the control unit 7 and the battery charger 100 are omitted. FIG. 4 also shows the charging state where the charging apparatus 1 is connected to the battery charger 100 that is configured in conformity with the ultra-fast charging standard of 150-kW class (a maximum voltage of 500V, a maximum current of 400 A, a maximum output of 150 kW) described before. Furthermore, the first storage battery 2 is designed to have a voltage VB1 of 500V, and the second storage battery 3 is designed to have a voltage VB2 of 500V.

As shown in FIG. 4, in a first parallel connection state, the switching elements 41a, 51a that are the upper arm elements of U phase are set to ON, the switching elements 42b, 52b that are the lower arm elements of V phase are set to ON, and the switching elements 43b, 53b that are the lower arm elements of W phase are set to ON in both the first inverter 4 and the second inverter 5. In the first parallel connection state, the winding wire 21 of U phase is put in the single connection.

When the direct-current electric power from the battery charger 100, which is an external power source with a maximum output of 150 kW, is supplied to the charging apparatus 1 in the first parallel connection state, a current I1 of 400 A flows into the electric power source circuit 10 from the positive electrode terminal 8A of the charging port 8. The current I1 is divided at the first connection point 11 into a current I2 of 200 A that flows to the first storage battery 2 side and a current I3 of 200 A that flows to a second storage battery 3 side.

On the first storage battery 2 side, the current I2 of 200 A flows from the first connection point 11 to the positive electrode of the first storage battery 2. The current I2 of 200 A, flowing from the negative electrode side of the first storage battery 2 to the lower arm of the first inverter 4, is divided into a current I4 of 100 A passing through the switching element 42b that is the lower arm element of V phase, and a current I5 of 100 A passing through the switching element 43b that is the lower arm element of W phase. The current I4 flows from the switching element 42b that is the lower arm element of V phase to the winding wire 22 of V phase. The current I5 flows from the switching element 43b that is the lower arm element of W phase to the winding wire 23 of W phase. That is, the current I4 of 100 A flows to the winding wire 22 of V phase, and the current I5 of 100 A flows to the winding wire 23 of W phase. The current I4 of 100 A flows from the winding wire 22 of V phase toward the second connection point 12 via the switching element 52b that is the lower arm element of V phase of the second inverter 5. Furthermore, the current I5 of 100 A flows from the winding wire 23 of W phase toward the second connection point 12 via the switching element 53b that is the lower arm element of W phase of the second inverter 5.

On the second storage battery 3 side, the current I3 of 200 A flows from the first connection point 11 into the upper arm of the first inverter 4. The current I3 flows through the switching element 41a that is the upper arm element of U phase of the first inverter 4, into the winding wire 21 of U phase. That is, the current I3 of 200 A flows to the winding wire 21 of U phase. The current I3 of 200 A then flows from the winding wire 21 of U phase into the positive electrode of the second storage battery 3 via the switching element 51a that is the upper arm element of U phase of the second inverter 5. Then, the current I3 travels from the negative electrode side of the second storage battery 3 to the second connection point 12. Furthermore, the current I3 of 200 A, the current I4 of 100 A, and the current I5 of 100 A merge at the second connection point 12 to be a current I6 of 400 A. The current I6 flows from the second connection point 12 to the negative electrode terminal 8B of the charging port 8.

Thus, in the second embodiment, ON and OFF of the switching elements of the inverters 4, 5 are switched such that the current of 200 A is fed to the winding wire of any one phase, out of the winding wires 21, 22, 23 of the three phases, and the current of 100 A is fed to the remaining winding wires of the two phases. That is, the current of 200 A flows to the winding wire in the single connection, and the current of 100 A flows to the remaining winding wires of two phases in the parallel connection. The control unit 7 of the second embodiment performs control (equalization control) for switching the winding wire in the single connection in order to equalize the heat values generated in the winding wires 21, 22, 23 of the respective phases at the time of charging. When the control unit 7 performs the equalization control, a difference among heat values generated in the winding wire 21 of U phase, the winding wire 22 of V phase, and the winding wire 23 of W phase can be reduced. The parallel connection state shown in the FIG. 4 is one of the states switched by the equalization control. More specifically, by performing the equalization control, the control unit 7 can switch the winding wire of one phase that is shifted, for example, from the first parallel connection state to a second parallel connection state and then to the single connection state.

FIG. 5 is a time chart showing a temperature change in the winding wires of the three phases. First, at time t1 the charging apparatus 1 starts charging from the battery charger 100. At the start of charging, the charging apparatus 1 is in the first parallel connection state described before. In the inverters 4, 5, the switching elements 41a, 51a that are the upper arm elements of U phase are set to ON (U phase upper ON), the switching elements 42b, 52b that are the lower arm elements of V phase are set to ON (V phase lower ON), and the switching elements 43b, 53b that are the lower arm elements of W phase are set to ON (W phase lower ON). In the first parallel connection state, the winding wire 21 of U phase is in the single connection, and the current of 200 A flows thereto. The current of 100 A flows to both the winding wire 22 of V phase and the winding wire 23 of W phase. Accordingly, after time t1, the winding temperature of U phase (shown with a broken line in FIG. 5) becomes higher than the winding temperature of other phases. At time t2, the winding temperature of U phase reaches a threshold.

At time t2, in the inverters 4, 5, the ON state and the OFF state of the switching elements of W phase are exchanged, and the winding wire in the single connection is switched from U phase to V phase. In this case, the switching elements 43b, 53b that are the lower arm elements of W phase are switched from ON to OFF, and switching element 43a, 53a that are the upper arm elements of W phase are switched from OFF to ON. Thus, the connection state is switched from the first parallel connection state to the second parallel connection state.

After time t2, the second parallel connection state becomes effective, and the current of 100 A flows to the winding wire 21 of U phase, so that the winding temperature of U phase lowers. Instead of the winding wire 21 of U phase, the winding wire 22 of V phase is put in the single connection, and the current of 200 A flows thereto. Hence, the winding temperature of V phase (shown with a thick line in FIG. 5) becomes higher than the winding temperature of other phases. Then, at time t3, the winding temperature of V phase reaches a threshold.

At time t3, in the inverters 4, 5, the ON state and the OFF state of the switching elements of U phase are exchanged, and the winding wire in the single connection is switched from U phase to V phase. In this case, the switching elements 41a, 51a that are the upper arm elements of U phase are switched from ON to OFF, and the switching element 41b, 51b that are the lower arm elements of U phase are switched from OFF to ON. Thus, the connection state is switched from the second parallel connection state to a third parallel connection state.

After time t3, the third parallel connection state becomes effective, and the current of 100 A flows to the winding wire 22 of V phase, so that the winding temperature of V phase lowers. Instead of the winding wire 22 of V phase, the winding wire 23 of W phase is put in the single connection, and the current of 200 A flows thereto. Hence, the winding temperature of W phase (shown with a thin solid line in FIG. 5) becomes higher than the winding temperature of other phases. At time t4, the winding temperature of W phase reaches a threshold.

At time t4, in the inverters 4, 5, the ON state and the OFF state of the switching elements of V phase are exchanged, and the winding wire in the single connection is switched from W phase to U phase. In this case, the switching elements 42b, 52b that are the lower arm elements of V phase are switched from ON to OFF, and the switching elements 42a, 52a that are the upper arm elements of V phase are switched from OFF to ON. Thus, the connection state is switched from the third parallel connection state to a fourth parallel connection state.

After time t4, the fourth parallel connection state becomes effective, and the current of 100 A flows to the winding wire 23 of W phase, so that the winding temperature of W phase lowers. Instead of the winding wire 23 of W phase, the winding wire 21 of U phase is put in the single connection, and the current of 200 A flows thereto. Hence, the winding temperature of U phase becomes higher than the winding temperature of other phases. Thus, ON and OFF of the switching elements are switched such that the winding temperature of the three phases becomes high in order within the threshold.

When the temperatures of the winding wires 21, 22, 23 of the three phases are available based on a temperature sensor or the like, the winding wire of the phase that is put in the single connection can be switched with use of the winding temperatures and the thresholds as shown in the FIG. 5. On the contrary, when the temperatures of the winding wires 21, 22, 23 of the three phases are not available, the winding wire of the phase that is put in the single connection may be switched in order of U phase, V phase, W phase based on a rule (see FIG. 6).

FIG. 6 shows a switching pattern of the parallel connection state. FIG. 6 shows six connection states from a first parallel connection state to a sixth parallel connection state.

The first to fourth parallel connection states shown in FIG. 6 are the same as the first to fourth parallel connection states shown in FIG. 5 described before.

In the first parallel connection state, the winding wire 21 of U phase is put in the single connection, a current of 200 A flows through the upper arm of U phase, and a current of 100 A flows through the lower arms of V phase and W phase in each of the inverters 4, 5. In the second parallel connection state, the winding wire 22 of V phase is put in the single connection, a current of 200 A flows through the lower arm of V phase, and a current of 100 A flows through the upper arms of U phase and W phase in each of the inverters 4, 5. In the third parallel connection state, the winding wire 23 of W phase is put in the single connection, a current of 200 A flows through the upper arm of W phase, and a current of 100 A flows through the lower arms of U phase and V phase in each of the inverters 4, 5. In the fourth parallel connection state, the winding wire 21 of U phase is put in the single connection, a current of 200 A flows through the lower arm of U phase, and a current of 100 A flows through the upper arms of V phase and W phase in each of the inverters 4, 5. In the fifth parallel connection state, the winding wire 22 of V phase is put in the single connection, a current of 200 A flows through the upper arm of V phase, and a current of 100 A flows through the lower arms of U phase and W phase in each of the inverters 4, 5. In the sixth parallel connection state, the winding wire 23 of W phase is put in the single connection, a current of 200 A flows through the lower arm of W phase, and a current of 100 A flows through the upper arms of U phase and V phase in the inverters 4, 5.

When the first parallel connection state is switched to the second parallel connection state, the ON state and the OFF state of the switching elements 43a, 43b, 53a, 53b of W phase are exchanged, and the winding wire put in the single connection is switched from U phase to V phase. When the second parallel connection state is switched to the third parallel connection state, the ON state and the OFF state of the switching elements 41a, 41b, 51a, 51b of U phase are exchanged, and the winding wire put in the single connection is switched from V phase to W phase. When the third parallel connection state is switched to the fourth parallel connection state, the ON state and the OFF state of the switching elements 42a, 42b, 52a, 52b of V phase are exchanged, and the winding wire put in the single connection is switched from W phase to U phase. When the fourth parallel connection state is switched to the fifth parallel connection state, the ON state and the OFF state of the switching elements 43a, 43b, 53a, 53b of W phase are exchanged, and the winding wire put in the single connection is switched from U phase to V phase. When the fifth parallel connection state is switched to the sixth parallel connection state, the ON state and the OFF state of the switching elements 41a, 41b, 51a, 51b of U phase are exchanged, and the winding wire put in the single connection is switched from V phase to W phase. Then, the sixth parallel connection state is switched to the first parallel connection state, and the connection state can be switched based on the rule described above. When the sixth parallel connection state is switched to the first parallel connection state, the ON state and the OFF state of the switching elements 42a, 42b, 52a, 52b of V phase are exchanged, and the winding wire put in the single connection is switched from W phase to U phase.

Figure 7:
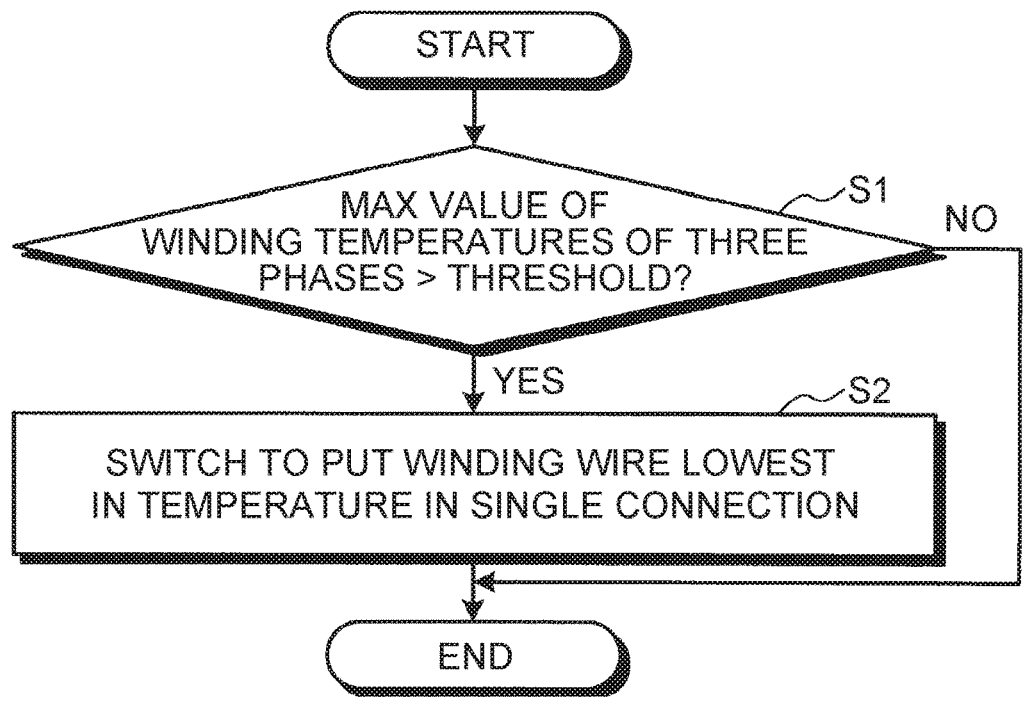
FIG. 7 is a flowchart showing a flow for switching control of the parallel connection state.

FIG. 7 is a flowchart showing a control flow for switching the parallel connection state. The control flow shown in FIG. 7 is repeatedly executed by the control unit 7 during charging. The control shown in FIG. 7 is equalization control performed while the two storage batteries 2, 3 are charged with the electric power supply from the battery charger 100 of an external power source, in the parallel connection state where the storage batteries 2, 3 are connected in parallel and a current flows to all the winding wires 21, 22, 23 of the three phases.

As shown in FIG. 7, the control unit 7 determines whether or not the highest winding temperature (Max value), among the winding temperatures of the three phases, is higher than a threshold (step S1). For example, when a current of 400 A flows from the positive electrode terminal 8A of the charging port 8 into the electric power source circuit 10, the control unit 7 determines in step S1 whether or not the winding temperature of the phase that receives a current flow of 200 A exceeds a threshold. That is, the control unit 7 determines whether or not the winding temperature of the phase put in the single connection exceeds a threshold. The threshold is set to a prescribed temperature which can secure charging efficiency in the charging apparatus 1, for example.

When positive determination is made in step S1 because the highest winding temperature, among the winding temperatures of the three phases, is higher than the threshold (step S1: Yes), the control unit 7 switches ON and OFF of the switching elements such that the winding wire of the phase that is lowest in temperature, among the winding wires 21, 22, 23 of the three phases, is put in the single connection (step S2). In step S2, the switching control of the parallel connection state shown in FIG. 5 is performed, and the winding wire of the phase in the single connection, which becomes high-temperature, is switched to be in the parallel connection so as to lower the winding temperature. When step S2 is performed, the control routine is ended.

When negative determination is made in step S1 because the highest winding temperature, among the winding temperatures of the three phases, is equal to or less than the threshold (step S1: No), the control routine is ended.

Figure 8:
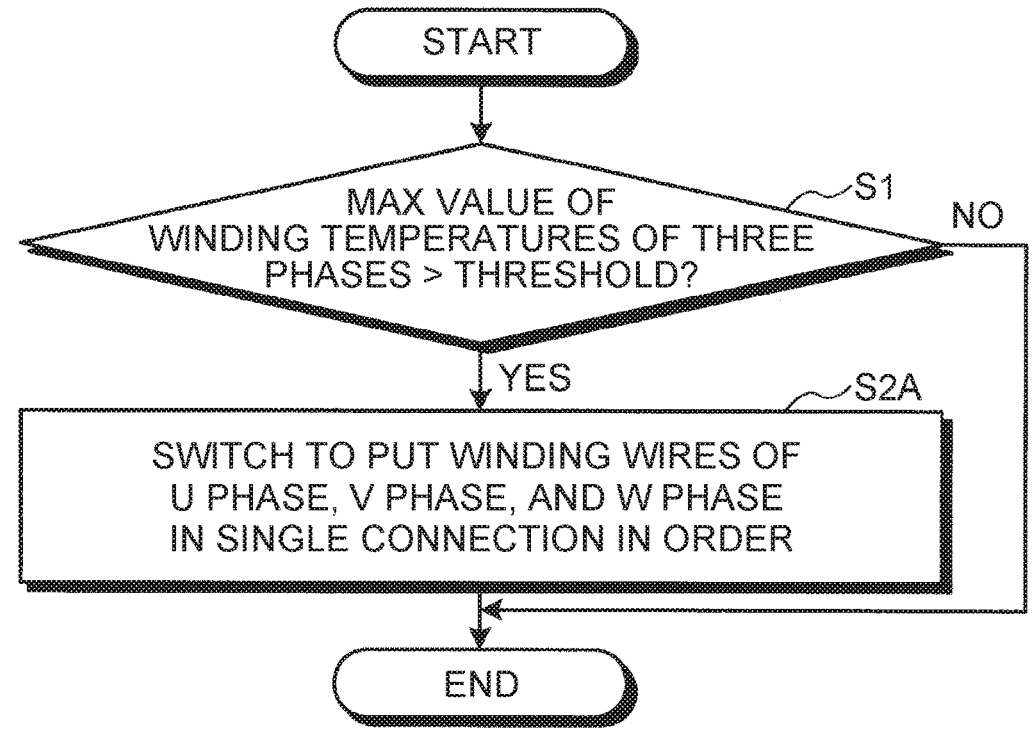
FIG. 8 is a flowchart showing a modification of the control flow shown in FIG. 7.

FIG. 8 is a flowchart showing a modification of the control flow shown in FIG. 7. Step S1 of FIG. 8 is the same process as step S1 of FIG. 7. As shown in FIG. 8, when positive determination is made in step S1 (step S1: Yes), the control unit 7 switches ON and OFF of the switching elements such that the winding wires of U phase, V phase, and W phase are put in single connection in order (step S2A). In step S2A, the switching control of the parallel connection state is performed based on the rule shown in FIG. 6 such that the winding wire of the phase in the single connection, which becomes high-temperature, is switched to be in the parallel connection so as to lower the winding temperature. When step S2A is performed, the control routine is ended.

Figure 9:
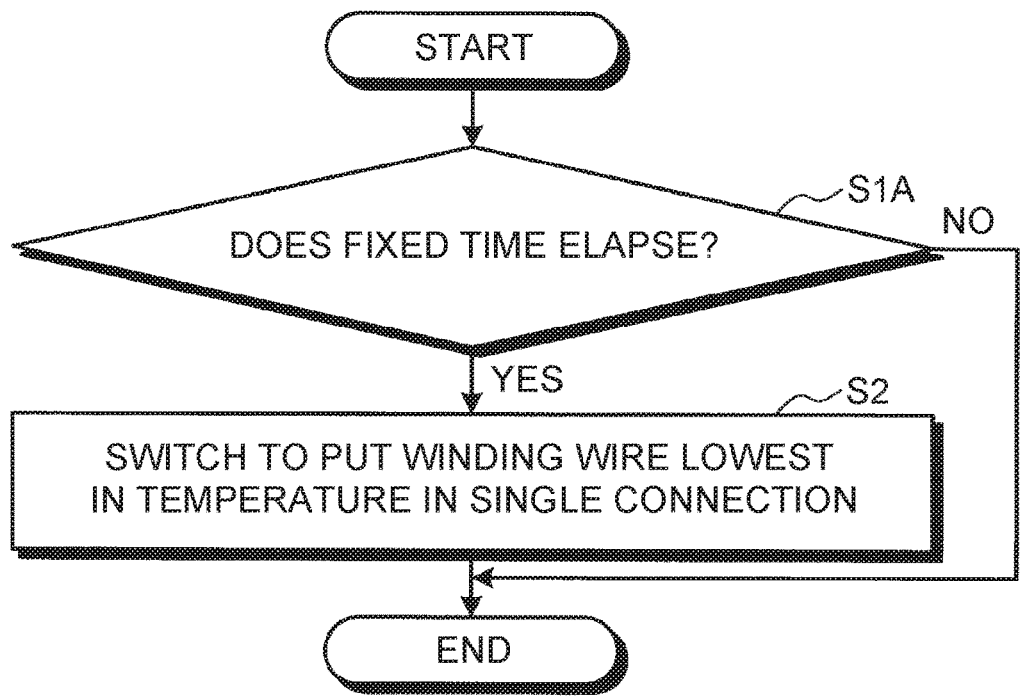
FIG. 9 is a flowchart showing another modification of the control flow shown in FIG. 7.

FIG. 9 is a flowchart showing another modification of the control flow shown in FIG. 7. Step S2 of FIG. 9 is the same process as step S2 of FIG. 7. As shown in FIG. 9, the control unit 7 determines whether or not a fixed time elapses, after charging is started in any one state out of the first to sixth parallel connection states described before (step S1A). For example, the control unit 7 determines whether or not a fixed time elapses, after the start of charging with the electric power supply of the battery charger 100 in the first parallel connection state. Alternatively, in step S1A, the control unit 7 determines whether or not a fixed time elapses, after one parallel connection state is switched to another parallel connection state, among the first to sixth parallel connection states. The fixed time may be a prescribed time determined in advance.

When positive determination is made in step S1A because a fixed time elapses (step S1A: Yes), the control routine proceeds to step S2. Contrary to this, when negative determination is made in step S1A because a fixed time does not elapse (step S1A: No), the control routine is ended.

Figure 10:
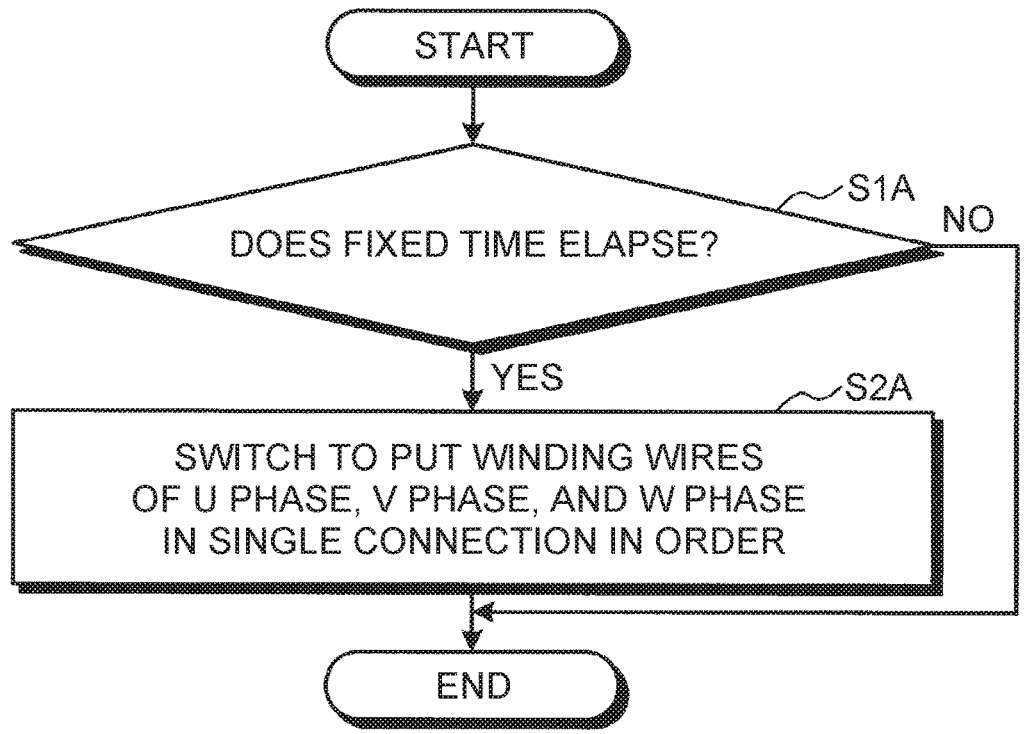
FIG. 10 is a flowchart showing a modification of the control flow shown in FIG. 9.

FIG. 10 is a flowchart showing a modification of the control flow shown in FIG. 9. Step S1A of FIG. 10 is the same process as step S1A of FIG. 9, and step S2A of FIG. 10 is the same process as step S2A of FIG. 8. As shown in FIG. 10, when positive determination is made in step S1A because a fixed time elapses during charging with the electric power supply from an external power source in the parallel connection state (step S1A: Yes), the control routine proceeds to step S2A. The control flow shown in FIG. 10 is the control which can switch the phase that is put in the single connection, even when the temperature of the winding wires 21, 22, 23 of the three phases is not available.

As described in the foregoing, the charging apparatus 1 of the second embodiment can reduce the difference among heat values generated in the winding wires 21, 22, 23 of the respective phases. Accordingly, when the two storage batteries 2, 3, in the state of being connected in parallel, are charged with the electric power supplied from the external battery charger 100, the heat values generated in the winding wires 21, 22, 23 of the respective phases can be equalized. Since the charging apparatus 1 can equalize the winding temperatures of the respective phases during fast charging, long-time fast charging can be achieved.

What is claimed is:
1. A charging apparatus, comprising:
an electric power source circuit including
a first storage battery,
a second storage battery,
a load,
a first inverter connected between the first storage battery and the load, and
a second inverter connected between the second storage battery and the load, the electric power source circuit being configured to drive the one load; and
a charging port that is connected with an external power source, when the first storage battery and the second storage battery are charged with electric power from the external power source, the charging port having a positive electrode terminal that is connected to a positive electrode side of the first storage battery, and a negative electrode terminal that is connected to a negative electrode side of the second storage battery, wherein
in a case where the electric power output from the external power source is first electric power, the electric power source circuit is in a state where the first storage battery and the second storage battery are connected in parallel when the first storage battery and the second storage battery are charged with the first electric power, and
in a case where the electric power output from the external power source is second electric power that is larger than the first electric power, the electric power source circuit is in a state where the first storage battery and the second storage battery are connected in series when the first storage battery and the second storage battery are charged with the second electric power.
2. The charging apparatus according to claim 1, wherein the first electric power is electric power having a maximum voltage of a first value and a maximum current of a prescribed current value, and the second electric power is electric power having a maximum voltage of a second value that is larger than the first value and a maximum current of a prescribed current value.

3. The charging apparatus according to claim 2, wherein
the first storage battery and the second storage battery have voltages set to the first value, and a sum of the voltage of the first storage battery and the voltage of the second storage battery are set to the second value.

4. The charging apparatus according to claim 1, wherein
the load is a three-phase alternating-current electric motor that is driven with alternating-current electric power, and
the charging apparatus further comprises a control unit configured to perform equalization control that reduces a difference among heat values generated in winding wires of three phases of the three-phase alternating-current electric motor, when the first storage battery and the second storage battery are charged with the electric power from the external power source.

5. The charging apparatus according to claim 4, wherein
the first inverter and the second inverter each include switching elements corresponding to the respective phases of the three-phase alternating-current motor, and
the control unit is configured to perform control of switching ON and OFF of the switching elements as the equalization control.

6. The charging apparatus according to claim 5, wherein
the first inverter and the second inverter each include the six switching elements included in upper-lower arms of the respective phases, and
when the first storage battery and the second storage battery are connected in parallel to charge the first storage battery and the second storage battery with the first electric power, the control unit is configured to perform, as the equalization control, ON and OFF control of the switching elements to achieve a connection state where a first current value of a current flowing through a winding wire of one phase, out of winding wires of three phases, becomes larger than a second current value of a current flowing through winding wires of remaining two phases.

7. The charging apparatus according to claim 6, wherein
when a winding wire of one phase, out of winding wires of the three phases, has a temperature higher than a prescribed threshold, the control unit is configured to switch ON and OFF of the switching elements such that the current of the first current value flows into the winding wire lowest in temperature among the winding wires of the three phases.

8. The charging apparatus according to claim 6, wherein
when a winding wire of one phase, out of the winding wires of the three phases, has a temperature higher than a prescribed threshold, the control unit is configured to switch ON and OFF of the switching elements such that the current of the first current value flows into the winding wires of U phase, V phase, and W phase in order.

9. The charging apparatus according to claim 6, wherein
when a prescribed time elapses during the equalization control, the control unit is configured to switch ON and OFF of the switching elements such that the current of the first current value flows into the winding wire lowest in temperature among the winding wires of the three phases.

10. The charging apparatus according to claim 6, wherein
when a prescribed time elapses during the equalization control, the control unit is configured to switch ON and OFF of the switching elements such that the current of the first current value flows into the winding wires of U phase, V phase, and W phase in order.

11. The charging apparatus according to claim 5, wherein
when the first storage battery and the second storage battery are connected in series to charge the first storage battery and the second storage battery with the second electric power, the control unit is configured to turn on lower arm elements of all the three phases among the switching elements included in the first inverter, and turn on upper arm elements of all the three phases among the switching elements included in the second inverter, as the equalization control.

* * * * *